US012688066B2

(12) United States Patent
Ranjan et al.

(10) Patent No.: US 12,688,066 B2
(45) Date of Patent: Jul. 21, 2026

(54) SYSTEM AND METHOD FOR CENTRALIZED ANALYSIS AND MONITORING OF PROCESS DATA VIA BASELINE DATA MAPPING

(71) Applicant: BANK OF AMERICA CORPORATION, Charlotte, NC (US)

(72) Inventors: Prabhat Ranjan, Plano, TX (US); Shilpa Banerjee, Charlotte, NC (US); Venkateswara Rao Daliparthi, Hyderabad (IN); Sireesha K. Gorantla, Frisco, TX (US); Sean Edward Melvin, Indian Trail, NC (US); Karan Singh Negi, Gurugram (IN); Rajsekhar Singha Roy, Irving, TX (US); Pradeep Kalarickakudy Vijayan, Mumbai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 585 days.

(21) Appl. No.: 18/121,734

(22) Filed: Mar. 15, 2023

(65) Prior Publication Data

US 2024/0311188 A1    Sep. 19, 2024

(51) Int. Cl.
| | |
|---|---|
| *G06F 9/48* | (2006.01) |
| *G06F 9/54* | (2006.01) |
| *G06F 16/25* | (2019.01) |

(52) U.S. Cl.
CPC ............ *G06F 9/4887* (2013.01); *G06F 9/542* (2013.01); *G06F 16/25* (2019.01)

(58) Field of Classification Search
CPC ........ G06F 9/4887; G06F 9/542; G06F 16/25; G06F 11/3055
USPC .......................................................... 718/1
See application file for complete search history.

(56) References Cited

U.S. PATENT DOCUMENTS

| | | | |
|---|---|---|---|
| 6,665,716 | B1 | 12/2003 | Hirata et al. |
| 7,725,572 | B1 | 5/2010 | Kautzleben |
| 8,146,103 | B2 | 3/2012 | Schmidt et al. |
| 8,176,135 | B2 | 5/2012 | Lau et al. |
| 9,606,903 | B2 | 3/2017 | Murugesan |
| 9,870,266 | B2 | 1/2018 | George |
| 10,489,384 | B2 | 11/2019 | Gould et al. |
| 11,275,610 | B2 | 3/2022 | Ranjan et al. |

(Continued)

*Primary Examiner* — Tuan C Dao

(74) *Attorney, Agent, or Firm* — Moore & Van Allen PLLC; Nicholas C. Russell

(57) ABSTRACT

Systems, computer program products, and methods are described herein for centralized analysis and monitoring of process data via baseline data mapping. The system is configured to retrieve a plurality of backend processes and store baseline data, wherein the baseline data comprises data from a database indicating a status of each of a plurality of enabled backend processes. The system is further configured to monitor the plurality of backend processes at a predetermined interval, and in response to monitoring, store, in a database, monitoring data, wherein the monitoring data comprises data indicating a status for each of the plurality of backend processes. The system is further configured to access the database, at the predetermined interval, to compare the status for each of the plurality of backend processes to the corresponding baseline data and generate at least one of a report and an update to a process status portal.

17 Claims, 8 Drawing Sheets

(56)                  References Cited

U.S. PATENT DOCUMENTS

| | | | | |
|---|---|---|---|---|
| 2004/0010667 | A1* | 1/2004 | Brenner | G06F 9/5088 |
| | | | | 711/119 |
| 2006/0190310 | A1 | 8/2006 | Gudla et al. | |
| 2007/0276901 | A1* | 11/2007 | Glinsky | G06F 9/485 |
| | | | | 709/201 |
| 2009/0327933 | A1* | 12/2009 | Dunn | H04L 67/12 |
| | | | | 715/764 |
| 2010/0309734 | A1* | 12/2010 | Ehrenreich | G11C 29/028 |
| | | | | 365/189.07 |
| 2010/0318635 | A1* | 12/2010 | Senda | H04N 17/004 |
| | | | | 709/219 |
| 2011/0320586 | A1* | 12/2011 | Maltz | H04L 43/0817 |
| | | | | 709/224 |
| 2012/0303740 | A1* | 11/2012 | Ferris | G06F 16/182 |
| | | | | 709/217 |
| 2013/0152103 | A1* | 6/2013 | Jea | G06F 9/522 |
| | | | | 718/104 |
| 2014/0068621 | A1 | 3/2014 | Sitaraman et al. | |
| 2014/0165027 | A1 | 6/2014 | Herbert | |
| 2014/0258235 | A1 | 9/2014 | Jin et al. | |
| 2014/0278808 | A1* | 9/2014 | Iyoob | G06Q 30/0206 |
| | | | | 705/7.35 |
| 2015/0033288 | A1* | 1/2015 | Lim | H04L 63/205 |
| | | | | 726/1 |
| 2015/0264122 | A1* | 9/2015 | Shau | H04L 69/40 |
| | | | | 709/203 |
| 2015/0286969 | A1 | 10/2015 | Warner et al. | |
| 2017/0075749 | A1* | 3/2017 | Ambichl | G06F 11/3476 |
| 2017/0288957 | A1* | 10/2017 | Liu | G06F 11/30 |
| 2018/0145995 | A1* | 5/2018 | Roeh | H04L 43/12 |
| 2018/0232436 | A1* | 8/2018 | Elson | G10L 15/22 |
| 2018/0352024 | A1* | 12/2018 | Ni | G06F 11/00 |
| 2019/0108471 | A1* | 4/2019 | Widanapathirana | |
| | | | | G06Q 10/063118 |
| 2020/0226037 | A1 | 7/2020 | Pope et al. | |
| 2020/0293898 | A1* | 9/2020 | Okamoto | G06N 20/20 |
| 2020/0326936 | A1* | 10/2020 | Sigmon | G06F 8/60 |
| 2020/0364127 | A1* | 11/2020 | White | G06F 11/263 |
| 2021/0152455 | A1* | 5/2021 | Castle | H04L 43/0876 |

* cited by examiner

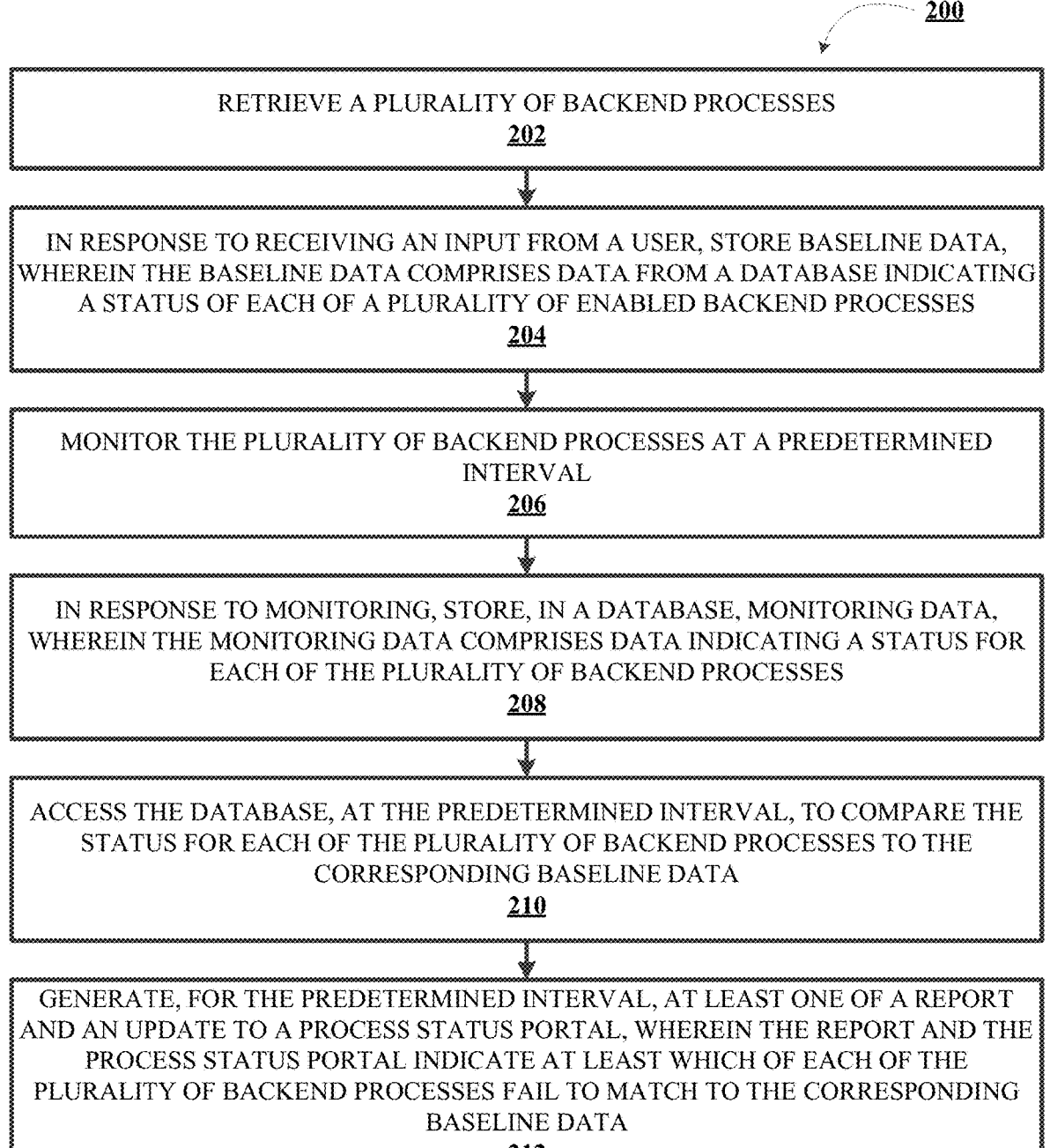

200

RETRIEVE A PLURALITY OF BACKEND PROCESSES
202

IN RESPONSE TO RECEIVING AN INPUT FROM A USER, STORE BASELINE DATA, WHEREIN THE BASELINE DATA COMPRISES DATA FROM A DATABASE INDICATING A STATUS OF EACH OF A PLURALITY OF ENABLED BACKEND PROCESSES
204

MONITOR THE PLURALITY OF BACKEND PROCESSES AT A PREDETERMINED INTERVAL
206

IN RESPONSE TO MONITORING, STORE, IN A DATABASE, MONITORING DATA, WHEREIN THE MONITORING DATA COMPRISES DATA INDICATING A STATUS FOR EACH OF THE PLURALITY OF BACKEND PROCESSES
208

ACCESS THE DATABASE, AT THE PREDETERMINED INTERVAL, TO COMPARE THE STATUS FOR EACH OF THE PLURALITY OF BACKEND PROCESSES TO THE CORRESPONDING BASELINE DATA
210

GENERATE, FOR THE PREDETERMINED INTERVAL, AT LEAST ONE OF A REPORT AND AN UPDATE TO A PROCESS STATUS PORTAL, WHEREIN THE REPORT AND THE PROCESS STATUS PORTAL INDICATE AT LEAST WHICH OF EACH OF THE PLURALITY OF BACKEND PROCESSES FAIL TO MATCH TO THE CORRESPONDING BASELINE DATA
212

FIG. 2

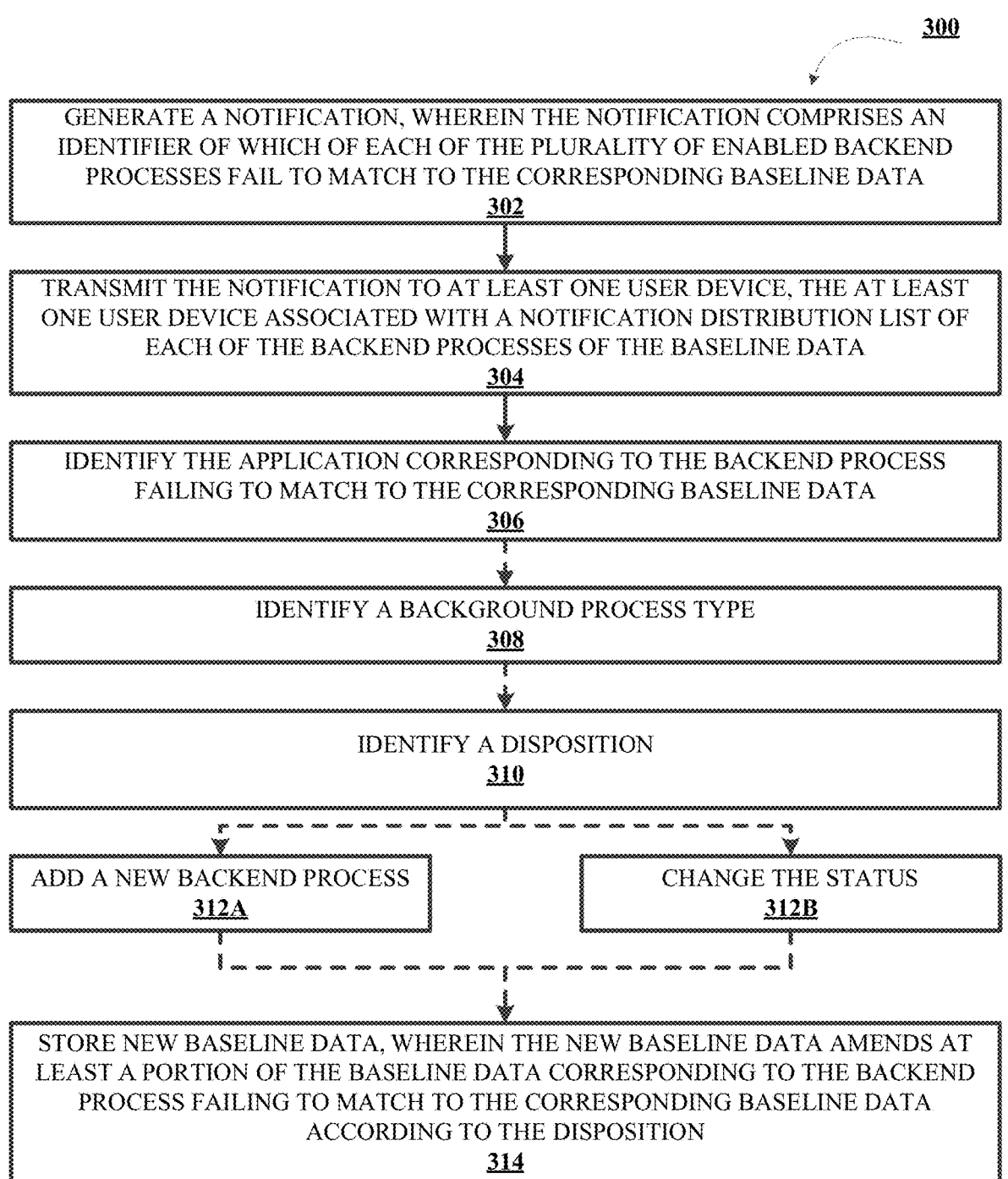

GENERATE A NOTIFICATION, WHEREIN THE NOTIFICATION COMPRISES AN IDENTIFIER OF WHICH OF EACH OF THE PLURALITY OF ENABLED BACKEND PROCESSES FAIL TO MATCH TO THE CORRESPONDING BASELINE DATA
302

TRANSMIT THE NOTIFICATION TO AT LEAST ONE USER DEVICE, THE AT LEAST ONE USER DEVICE ASSOCIATED WITH A NOTIFICATION DISTRIBUTION LIST OF EACH OF THE BACKEND PROCESSES OF THE BASELINE DATA
304

IDENTIFY THE APPLICATION CORRESPONDING TO THE BACKEND PROCESS FAILING TO MATCH TO THE CORRESPONDING BASELINE DATA
306

IDENTIFY A BACKGROUND PROCESS TYPE
308

IDENTIFY A DISPOSITION
310

ADD A NEW BACKEND PROCESS
312A

CHANGE THE STATUS
312B

STORE NEW BASELINE DATA, WHEREIN THE NEW BASELINE DATA AMENDS AT LEAST A PORTION OF THE BASELINE DATA CORRESPONDING TO THE BACKEND PROCESS FAILING TO MATCH TO THE CORRESPONDING BASELINE DATA ACCORDING TO THE DISPOSITION
314

FIG. 3

SYSTEM AND METHOD FOR CENTRALIZED ANALYSIS AND MONITORING OF PROCESS DATA VIA BASELINE DATA MAPPING

FIELD OF THE INVENTION

The present invention embraces a system for centralized analysis and monitoring of process data via baseline data mapping.

BACKGROUND

Current entity process management software monitoring tools require the manual monitoring of backend processes, schedulers, queue processes, and the monitoring of broken queues, and solutions are error-prone and not compatible with cloud computing. Other monitoring tools are dependent on middleware layers that are integrated between an HTML/ JavaScript layer and a database layer. Moreover, current monitoring tools have no user interface to readily support configuration management, onboarding of new processes, or offloading of older processes without the use of specialized support teams. Entities require the monitoring of backend processes to determine the functionality of the entity applications and problem-solve via the appropriate resources. Without such features, the current solutions are time-consuming and constrain resources. Accordingly, there is a need for a system and method for centralized analysis and monitoring of process data via baseline data mapping.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for centralized analysis and monitoring of process data via baseline data mapping is presented. The system may include: at least one non-transitory storage device; and at least one processing device coupled to the at least one non-transitory storage device, wherein the at least one processing device is configured to: retrieve a plurality of backend processes, in response to receiving an input from a user, store baseline data, wherein the baseline data may include data from a database indicating a status of each of a plurality of enabled backend processes, monitor the plurality of backend processes at a predetermined interval, in response to monitoring, store, in a database, monitoring data, wherein the monitoring data may include data indicating a status for each of the plurality of backend processes, access the database, at the predetermined interval, to compare the status for each of the plurality of backend processes to the corresponding baseline data, and generate, for the predetermined interval, at least one of a report and an update to a process status portal, wherein the report and the process status portal indicate at least which of each of the plurality of backend processes fail to match to the corresponding baseline data.

In some embodiments, the plurality of backend processes may include at least one selected from the group consisting of a queue processor and a job scheduler, wherein the job scheduler executes logic based on a schedule at a predetermined time interval, and wherein a queue processor is configured to process a flow of objects without regards to time intervals.

In some embodiments, retrieving the plurality of backend processes may include retrieving a plurality of inbound data import processes, each of the inbound data import processes are configured to monitor a file directory.

In some embodiments the at least one processing device is further configured to generate a notification, wherein the notification may include an identifier of which of each of the plurality of enabled backend processes fail to match to the corresponding baseline data.

In some embodiments, the at least one processing device is further configured to transmit the notification to at least one user device, wherein the at least one user device is associated with a notification distribution list, wherein the notification distribution list is stored in the baseline data, and wherein each backend process of the baseline data may include a notification distribution list.

In some embodiments, the at least one processing device is further configured to amend the baseline data if any of the each of the plurality of backend processes fails to match to the corresponding baseline data, wherein amending the baseline data for each backend process may include identifying an application corresponding to the backend process failing to match to the corresponding baseline data, identifying a backend process type, identifying a disposition, wherein the disposition indicates either (i) changing the status, or (ii) an addition of a new backend process, and storing new baseline data, wherein the new baseline data amends at least a portion of the baseline data corresponding to the backend process failing to match to the corresponding baseline data according to the disposition.

In some embodiments, the report may include details of each change to the baseline data and a user identifier associated with each change to the baseline data.

In another aspect, a computer program product for centralized analysis and monitoring of process data via baseline data mapping is presented. The computer program product may include a non-transitory computer-readable medium may include code causing a first apparatus to: retrieve a plurality of backend processes, in response to receiving an input from a user, store baseline data, wherein the baseline data may include data from a database indicating a status of each of a plurality of enabled backend processes, monitor the plurality of backend processes at a predetermined interval, in response to monitoring, store, in a database, monitoring data, wherein the monitoring data may include data indicating a status for each of the plurality of backend processes, access the database, at the predetermined interval, to compare the status for each of the plurality of backend processes to the corresponding baseline data, and generate, for the predetermined interval, at least one of a report and an update to a process status portal, wherein the report and the process status portal indicate at least which of each of the plurality of backend processes fail to match to the corresponding baseline data.

In yet another aspect, a method for centralized analysis and monitoring of process data via baseline data mapping is presented. The method may include: retrieving a plurality of backend processes, in response to receiving an input from a user, storing baseline data, wherein the baseline data may include data from a database indicating a status of each of a plurality of enabled backend processes, monitoring the plurality of backend processes at a predetermined interval, in response to monitoring, storing, in a database, monitoring data, wherein the monitoring data may include data indicating a status for each of the plurality of backend processes, accessing the database, at the predetermined interval, to compare the status for each of the plurality of backend processes to the corresponding baseline data; and generating, for the predetermined interval, at least one of a report and an update to a process status portal, wherein the report and the process status portal indicate at least which of each of the plurality of backend processes fail to match to the corresponding baseline data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
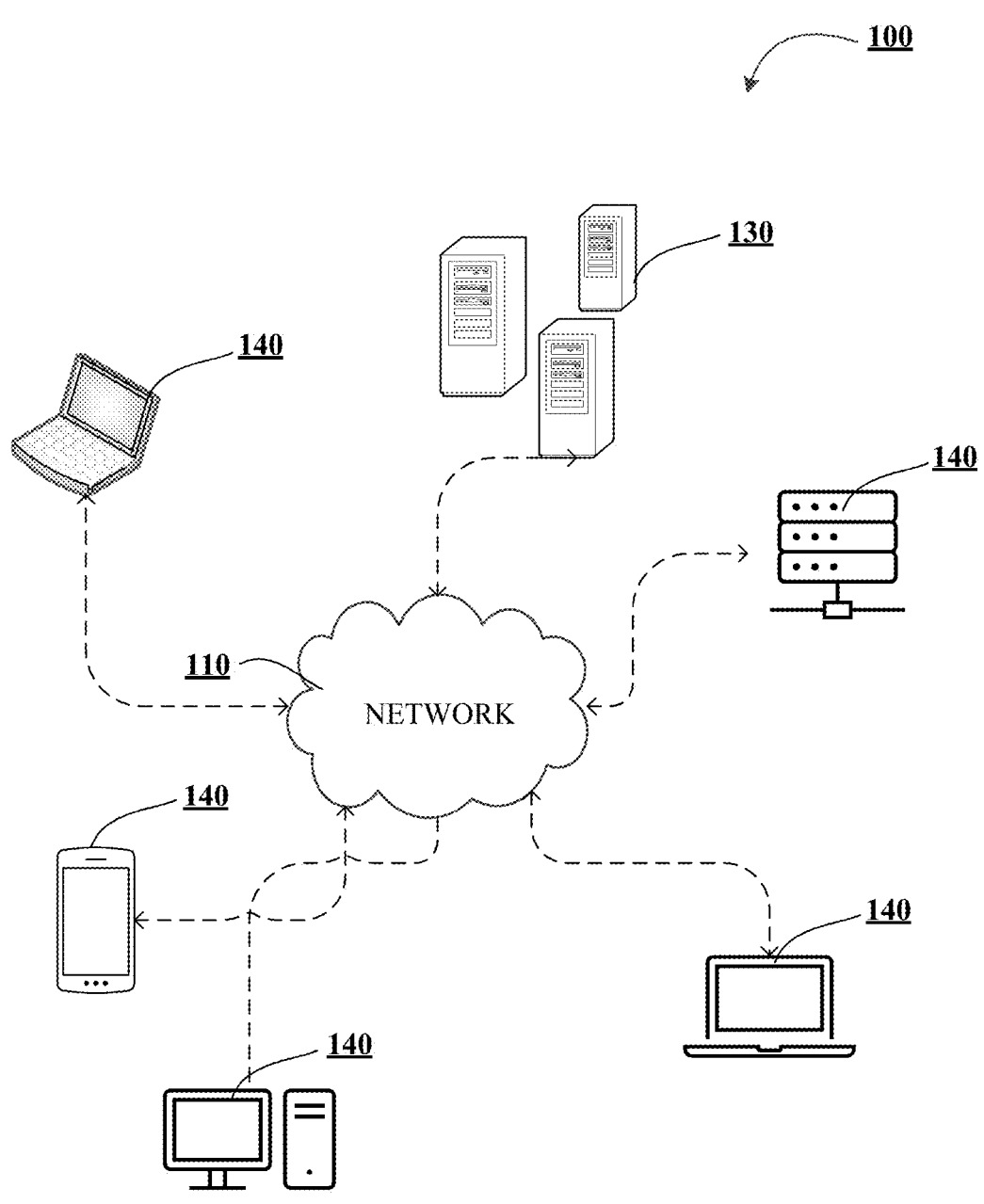
Figure 1B:
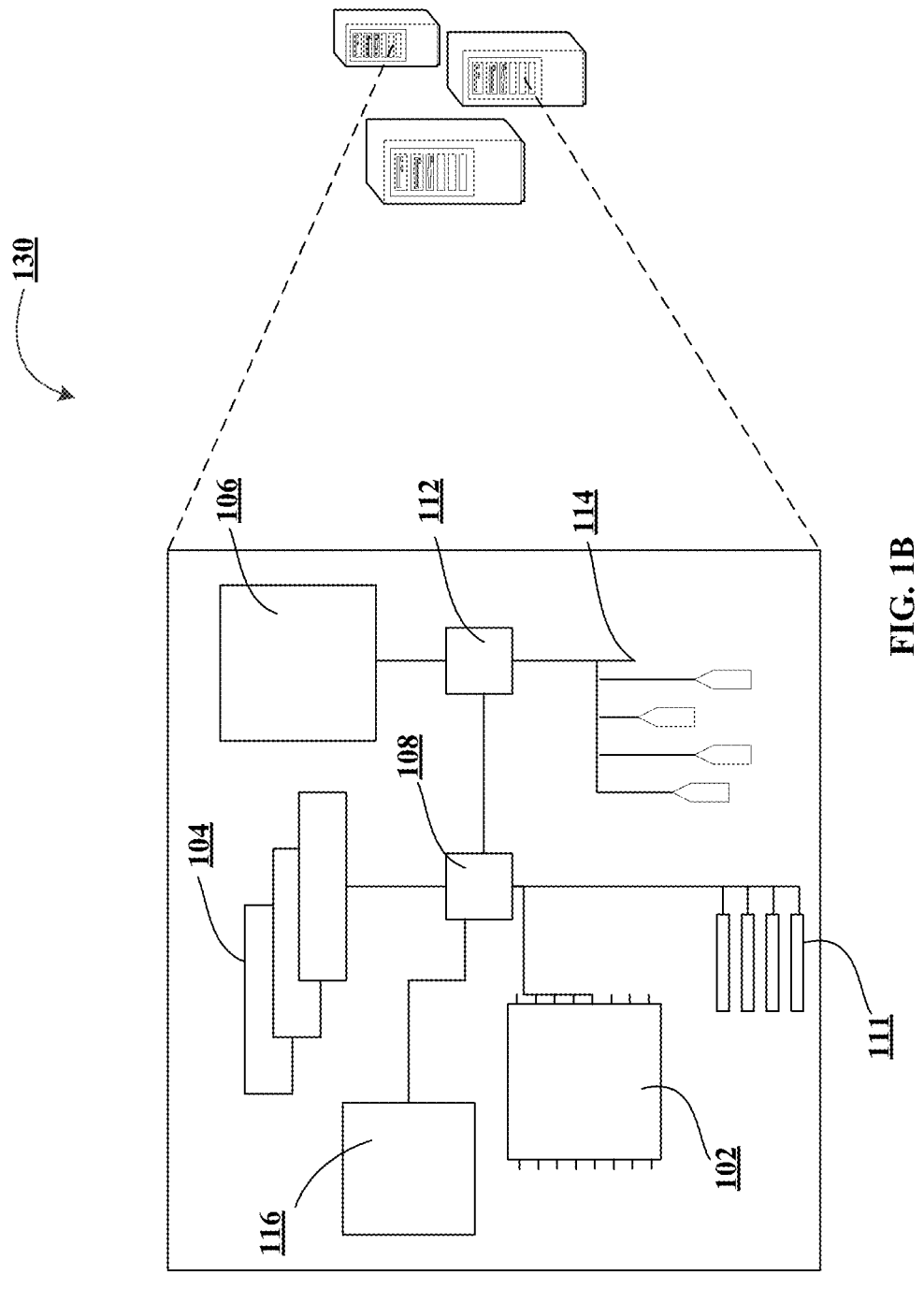
Figure 1C:
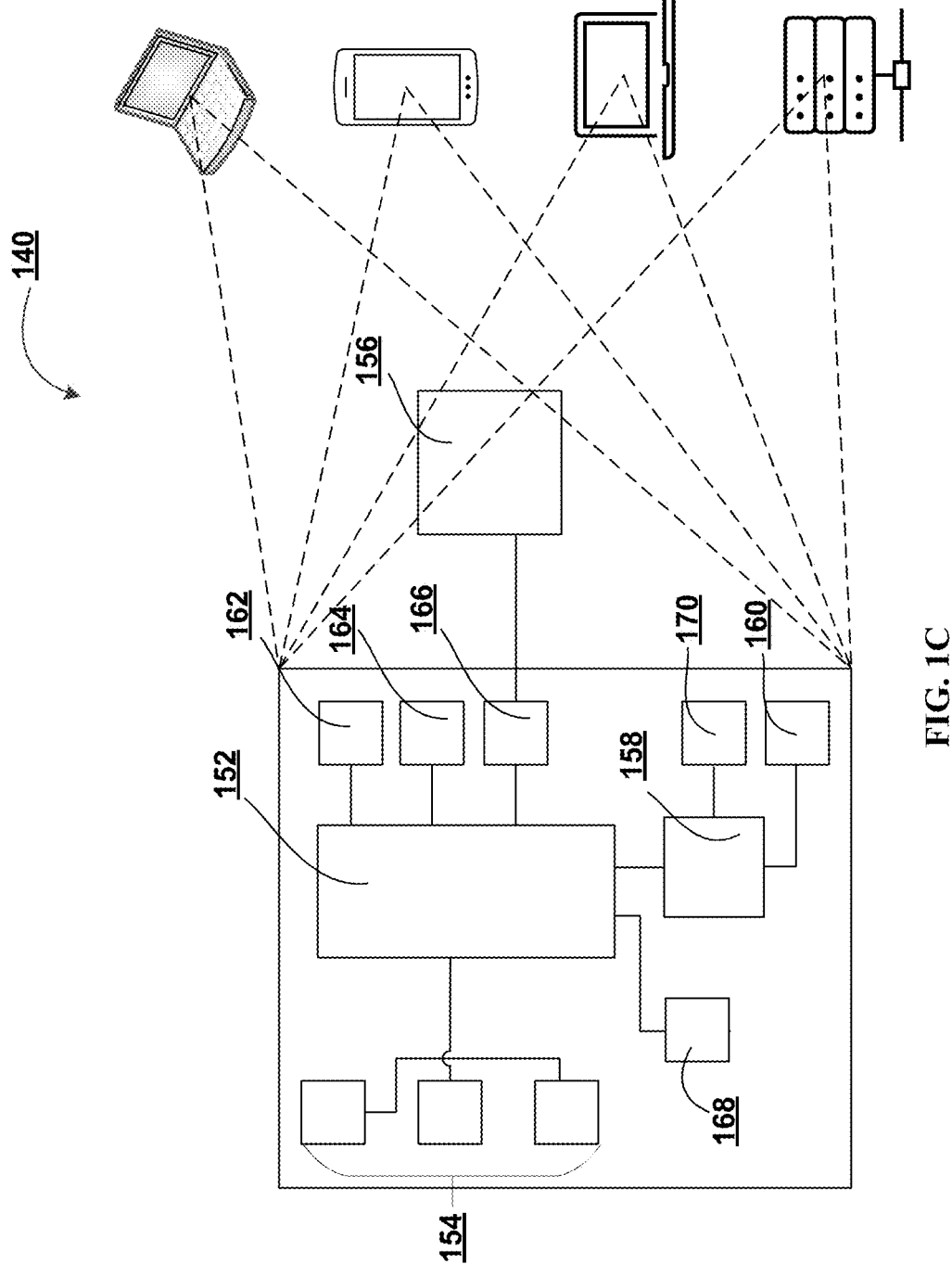
Figure 4:
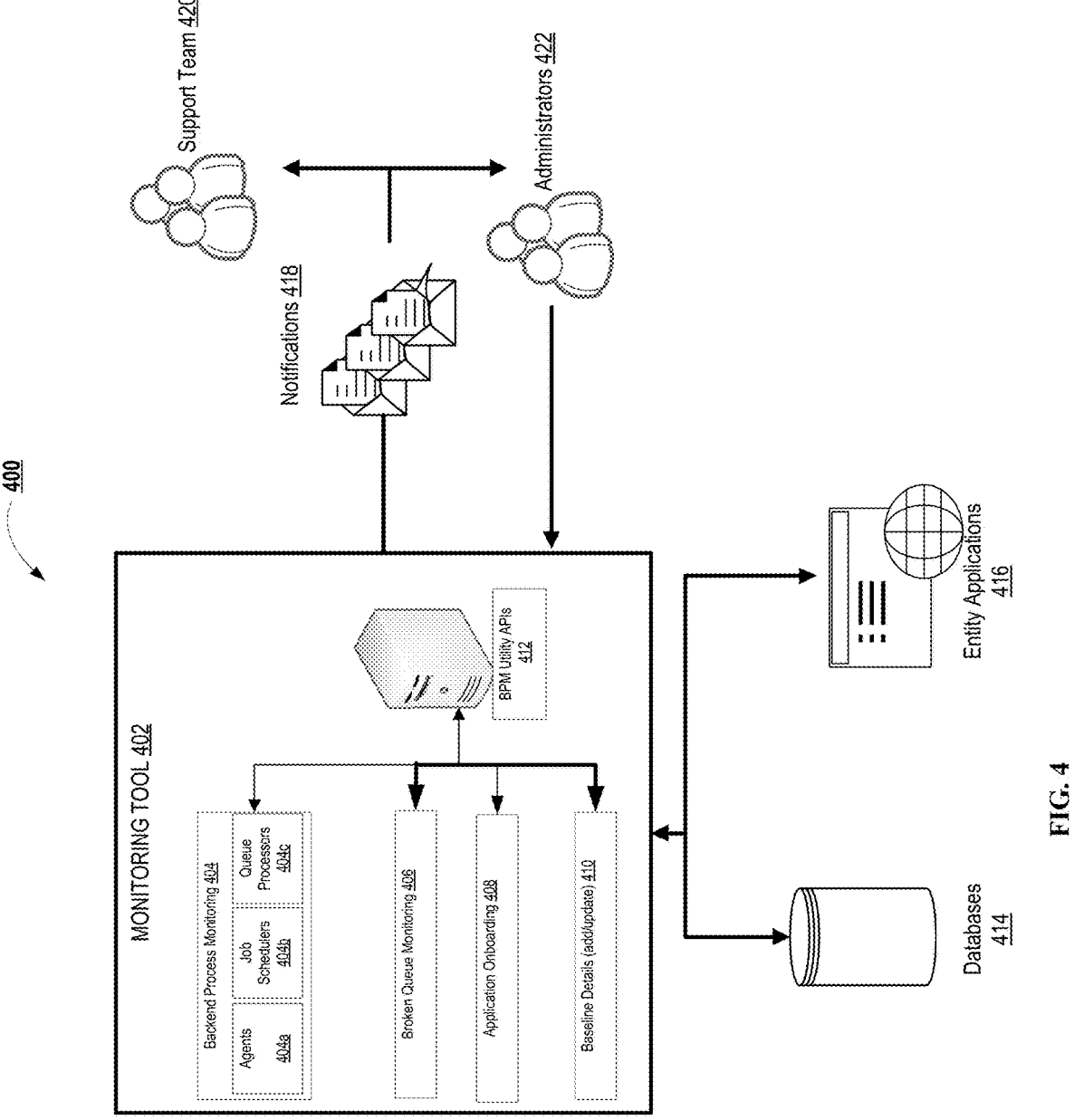
Figure 5:
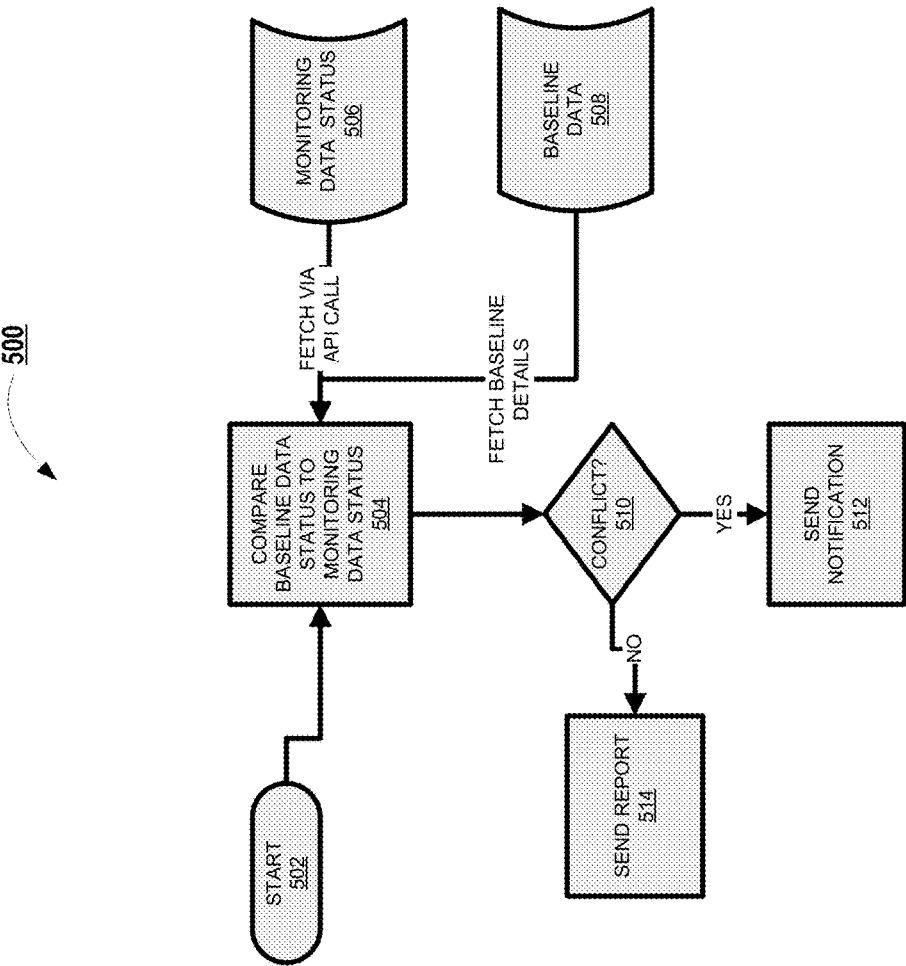
Figure 6:
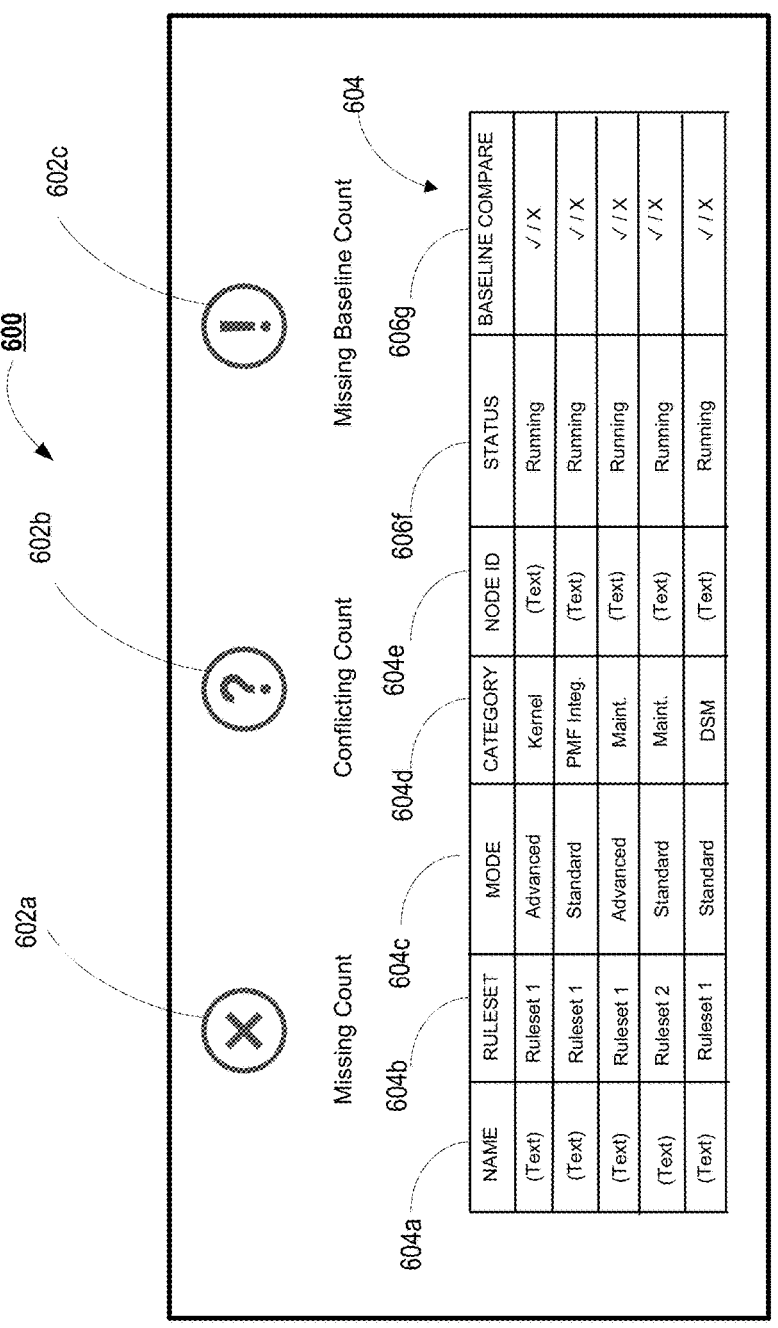

Having thus described embodiments of the invention in general terms, reference will now be made the accompanying drawings, wherein:

FIGS. 1A-1C illustrate technical components of an exemplary distributed computing environment for centralized analysis and monitoring of process data via baseline data mapping, in accordance with an embodiment of the invention;

FIG. 2 illustrates a process flow for centralized analysis and monitoring of process data via baseline data mapping, in accordance with an embodiment of the invention;

FIG. 3 illustrates a process flow for centralized analysis and monitoring of process data via baseline data mapping, in accordance with an embodiment of the invention;

FIG. 4 illustrates a schematic and flow diagram of a system for centralized analysis and monitoring of process data via baseline data mapping, in accordance with an embodiment of the invention;

FIG. 5 illustrates a process flow for centralized analysis and monitoring of process data via baseline data mapping, in accordance with an embodiment of the invention; and FIG. 6 illustrates an exemplary diagram of process status portal, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, "enabled" may refer to any computer process which is currently in operation and processing data. "Enabled" may be used interchangeable herein with words and phrases including, but not limited to: "active", "running", "operating", "executing" or the like. Similarly, "disabled" may refer to any computer process which is not currently in operation. "Disabled" may be used interchangeable with words and phrases including, but not limited to: "inactive", "not running", "not operating", "not executing", or the like.

According to embodiments of the invention, which will be described in detail herein, systems, methods and computer program products are disclosed that monitor backend processes, otherwise referred to as "agents", "job schedulers", "queue processors", and/or "listeners", and to identify those presently enabled backend processes that are or are not running/executing at any given moment compared to a static baseline previously stored in a storage device (e.g., database). If an enabled backend process is identified as not running/executing at a given time, and the baseline indicates that the backend process should be running, a notification is sent to one or more users associated with the entity. Similarly, if a disabled backend process is identified as running/executing at a given time, and the baseline indicates that the backend process should be disabled, a notification is sent to one or more users associated with the entity. The invention provides for such determinations to made on a regular interval, (e.g., daily, hourly, or the like), such that, reports may be generated and communicated and/or notification(s) provided to users associated with the entity, and the process status portal may be updated on the regular interval to reflect the current status of backend processes currently enabled/disabled within an enterprise. In this regard, the present invention can identify backend processes that are being executed unnecessarily or not being executed despite the baseline indicating a preference otherwise, identification of the backend process, in some instances real-time and corrective action(s) identified and implemented.

In specific embodiments of the invention, backend processes are associated with an entity process management (e.g., a Business Process Management ("BPM") utility). A BPM utility operates within an open-source environment, such as a Linux operating system. And manages data associated with the backend processes (e.g., "agents", "job schedulers", "listeners", and/or "queue processors"). A typical BPM utility cluster consists of several physical or virtual machine instances sharing a single database. Machine instances may have multiple web application server instances or BPM utility servers. Further, a typical BPM utility may be pre-configured with APIs available to manage cases and assignments of an application associated with the BPM, and may also allow for the implementation of customized APIs through REST/JSON services for external systems to integrate with the BPM utility to request, receive, send data, or invoke an action. This may be accomplished through the use of standard HTTP/HTTPS methods. In some embodiments, customized APIs may be used in conjunction with standard APIs provided by the BPM to send or receive data or invoke an action. In this regard, the present invention may read and retrieve data within the backend process, convert the data into structured data, and store the structured data in a database within a storage device. The structured data in the database may be the basis for determining the active (e.g., running or executed) or inactive (e.g., disabled or not running or executed) status of backend processes and generating and presenting the data within a report and/or process status portal.

It shall be appreciated that the API(s) described and implemented herein by the system may be constructed according the representational state transfer (REST) constraints and protocols, however other API conventions/web services may be implemented as required, such as SOAP, RCP, web sockets, XMLRCP, and so forth.

As used herein, "backend process data" or "backend processing data" may refer to any combination of one or more "agents", "queue processors", "agent queues", "job schedulers", and/or "listeners."

An "agent" may refer to an internal backend process operating on the server on a periodic basis which route assignment according to rules and perform system work such as sending emails or notifications, generating updated indexes for the full-text search feature, synchronizing caches across nodes in a multiple node system, and so on. The BPM utility may verify usage statistics for the agents and classify each agent as "running" when the agent is processing or waiting for a processing, "stopped" when disabled, or "exception" when there is an error. Categories of information for each agent may be the "node details", which displays usage and scheduling, "historical agent data", which displays node details for a selected period, and other details such as the queue to which the agent belongs. It shall be appreciated that a node may comprise one or more Java Virtual Machines (JVMs), such that when referring to "node details" or identification information of a node, this may refer to the details or identification information of a JVM. A "queue processor" may refer to an internal backend process that is configured for queue management and asynchronous message processing. A queue processor is configured to process a flow of objects without regard to time intervals. Standard queue processor rules may be used for simple queue management, or may be dedicated rules for higher throughput and customized message processing. Process data may provide the status of the queue processors in the system (e.g., their number, node relationship, historical data, status) in order to diagnose problems. The throughput may be illustrated for each queue processor, and in some embodiments the number of broken queries may be determines and illustrated. An "agent queue" may refer to a list of work to be done by an agent. Insight into the status of agent queues may be ascertained, such as "scheduled" for when agents or queue processors are waiting to be processed, "now-processing" for when an agent or queue processor in the queue is performing scheduled tasks, "success" when all the items in the agent queue are completed, or "broken-process" for when there is a problem. A "job scheduler" may refer to internal backend processes on the server that run activities on a periodic basis. A job scheduler executes logic based on a schedule at a predetermined time interval. Information about the status of jobs in the BPM utility may be ascertained such as duration, next scheduled execution, success rate, state, time of the prior execution, etc. A job scheduler may be "enabled" when it is not scheduled, or "disabled" when it is scheduled. A "listener" may refer to a backend process that waits for inbound network traffic or requests, and process data collected for each listener may be ascertained, such as items processed, total number of requests, errors. Each listener may be "running", "sleeping", "stopped", or "disabled". A listener collects process data on a plurality of inbound data import processes, wherein each of the inbound data import processes are configured to monitor a file directory.

The technology described herein implements a centralized process status portal interacted with by a user, on a user interface of an endpoint device, to view actively view and manage the backend processes for one or more applications across an entity. The process status portal also enables a user to add backend processes to a baseline of backend processes, view comparisons between currently enabled and disabled backend processes to the baseline, modify the baseline, modify the attributes for any given backend process, etc. Moreover, the solution described utilizes an application within the BPM utility that can execute on container infrastructure.

Prior to the invention described herein, there was no ideal way to monitor a plurality of applications with the same dashboard (e.g., process status portal), independent of a middleware component, and no way to manage the various backend processes for a plurality of applications within a centralized dashboard. Current solutions only allow for the management of a single application's backend processes. Moreover, prior to the invention described herein, there was no packaged solution to monitor "listener" and/or "queue processor" backend processes for BPM software, nor was there any monitoring tool for logging in an audit table the efforts undergone to implement solutions for broken queues.

The present disclosure provides for the centralized analysis and monitoring of process data via baseline data mapping. A plurality of backend processes are retrieved. These backend processes may include queue processors, inbound import processors (e.g., "listeners") and/or job schedulers. Then baseline data is stored as a result of an input/prompt from a user, where the baseline data indicates the status of each enabled backend process. Periodically, each backend process is monitored at a regular predetermined interval for their statuses, then each status is compared to the corresponding baseline data. Thereafter, for the predetermined interval, either a report or a process status portal update, or both, are generated, which indicate the specific backend processes to have failed to match to the corresponding baseline data. The report, if generated, may include a user identifier and/or timestamps for each change to the baseline data, as will be discussed herein. One or more notifications may be generated which has identification of each backend process that fails to match the corresponding baseline data. These one or more notifications may be transmitted to user device(s) corresponding to a notification distribution list as outlined in the baseline data for each backend process. The baseline data may also be amended should any of the plurality of backend processes fail to match the corresponding baseline data. Such amending may include the identification of application, backend process type, disposition, and subsequent storage of a new baseline data.

What is more, the present invention provides a technical solution to a technical problem. As described herein, the technical problem includes the inability for current solutions to monitor a plurality of applications within a centralized portal, and monitor a diverse set of backend processes, while alerting users to inconsistencies between the backend processes and a baseline, amending the baseline to add or remove backend processes. The technical solution presented herein allows for the monitoring of listeners, queue processors, and/or job schedulers by retrieving these backend processes and comparing against a baseline, along with notifications being generated to address any inconsistencies. In particular, the system is an improvement over existing autofill systems by completing questionnaires and the response strings therein (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for centralized analysis and monitoring of process data via baseline data mapping, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for centralized analysis and monitoring of process data via baseline data mapping, in accordance with an embodiment of the invention. It shall be appreciated that the monitoring tool, as will be described in detail hereinafter, is executed on the system 130. Accordingly, actions which are described herein as being performed with respect to system 130 may be performed specifically as a function of the monitoring tool therein.

The process may begin at block 202. As shown in block 202 a monitoring tool of the system 130 may retrieve a plurality of backend processes. The system 130 monitors backend processes including, but not limited to, listeners, queue processors, agents, and/or job schedulers.

Retrieval of backend processes may be accomplished using one or more customized API(s), and it shall be appreciated that each backend process to which the system 130 seeks to retrieve may require a unique API customization. In some embodiments, the system 130 mines the data received through the API, such as to extract relevant data, for example the name, ruleset, mode, category, node identifier, status, and so forth. Further, in some embodiments the system 130 converts the data from an unstructured format to a structured format such by providing groupings based on name, ruleset, mode, category, node identifier, status, and so forth. In some embodiments, the backend processes retrieved by the system 130 could be any combination of job schedulers, queue processors, agents, agent queues, and/or listeners.

The process may continue at block 204, where a user provides an input to the system 130, and subsequently the system 130 captures and stores baseline data. Baseline data is useful as a basis for determining whether backend processes at a given moment in time are performing as expected. The baseline data provides a reference point to which the system 130 compares backend processes from a subsequent point in time. Baseline data comprises data from a database within the storage device 106, the data indicating a status (e.g., active or inactive) of each of a plurality of backend processes.

In some embodiments, the system 130 may receive the input from a user through a graphical user interface of a user device in order to initiate the storing of baseline data. Subsequently, the system 130 iteratively captures the status of each of the plurality of backend processes that are presently enabled and stores the statuses in the database of the storage device 106. In other embodiments, baseline data may be captured and stored by the system 130 at a scheduled interval, such as hourly, daily, weekly, monthly, yearly, or at any interval predetermined by a user. In this way, the system 130 may be able to automatically store baseline data as various conditions and application use metrics within the entity change over time. In yet additional embodiments, the system 130 may also be configured with a scheduler, such that a user associated with the entity may indicate to the system 130, via a graphical user interface, an exact time and date that the system 130 should capture and store the baseline data.

After the baseline data is stored, the process may continue at block 206, wherein the system 130 monitors the plurality of backend processes at a predetermined interval and collects monitoring data. In order to determine at any given moment in time the status of the backend processes, and whether or not there are an errors or challenges to be resolved by users associated with the entity, the system 130 must regularly monitor the backend processes via the API(s) integrated with the BPM utility. To do so, a user may specify to the system 130 a predetermined interval in which to collect the monitoring data, such as daily, weekly, monthly, yearly, and so forth. Similar to the baseline data, the monitoring data may include the status of each of the plurality of enabled backend processes, disabled backend processes, or a combination thereof. Thereafter, the system 130 is configured to execute the monitoring process, during which the system 130 retrieves monitoring data, e.g., data associated with a plurality of backend processes, accomplished using one or more customized API(s). In some embodiments, the system 130 may mine the monitoring data received through the API, such as to extract relevant monitoring data, for example the name, ruleset, mode, category, node identifier, status, and so forth. Further, in some embodiments the system 130 may convert the monitoring data from an unstructured to a structured format such as providing groupings based on name, ruleset, mode, category, node identifier, status, and so forth. In some embodiments, the mining data retrieved by the system 130 could be associated with any combination of backend processes such as job schedulers, queue processors, agents, agent queues, and/or listeners.

The process may continue at block 208, where the system 130 in response to monitoring, stores the monitoring data in a database of storage device 106. The database may be the same database as used for storage of the baseline data, however in some embodiments the database may be distinct from that of the baseline data. Here, the monitoring data may be structured or unstructured, and comprises data for each of the plurality of backend processes to indicate a status, such as enabled (e.g., active, running, or executed) or disabled (e.g., inactive, not running, or not executed).

Continuing now at block 210, the system 130 accesses the database, subsequent the monitoring of the backend processes, at the same predetermined interval in order to match the plurality of backend processes and compare the status for each of the plurality of backend processes to the corresponding baseline data. In other words, the database containing the monitoring data is queried (e.g., accessed) to retrieve the monitoring data, while also retrieving the baseline data gathered and stored in the database in blocks 202 and 204. Subsequently, the system 130 determines the baseline data that corresponds with the monitoring data for a given backend process. This may be accomplished by iteratively comparing characters of the node identifier/address for a given backend process of the monitoring data to that of the baseline data to identify the corresponding backend process of the monitoring data with identical node identifier/address. Alternatively, this may be accomplished by iteratively comparing characters of the node identifier/address for a given backend process of the baseline data to that of the monitoring data to identify the corresponding backend process of the baseline data with identical node identifier/address. Additionally, or alternatively, the names of the backend process of the monitoring data may be compared the names of backend processes in the baseline data (or vice versa), according to the same iterative text comparison process.

Thereafter, once at least one backend process has been matched between the monitoring data and the baseline data, the system 130 may begin to compare the corresponding statuses between the status indicated in the monitoring data with the status indicated in the baseline data for the corresponding at least one backend process, such as to determine if the statuses are equal to one another (e.g., a "pass"), or different from one another (e.g., a "fail"). The comparison may be made by comparing the text strings to one another, as will be understood by one of ordinary skill in the art. For example, a status for a backend process in the monitoring data may indicate "enabled", while the status of the corresponding baseline data for the same backend process may indicate "disabled." In such an occurrence, the system 130 will determine a mismatch between the two statuses, thereby indicating a failure to match.

This matching process may be repeated for each backend process in the monitoring data or the baseline data. In the event that the system 130 is unable to match a backend process from the monitoring data to a backend process in the baseline data, or vice versa, the system 130 may notate such an occurrence in the baseline and/or monitoring data as a "missing count" (if missing from the monitoring data) or a "missing baseline count" (if missing from the baseline).

The process may continue at block 212 where the system 130 generates, for the predetermined interval at which the monitoring data is gathered, a report and/or an update to a process status portal. The report may be a matrix, chart, spreadsheet, or other combination of visual elements to display information regarding one or more of the backend processes, as will be described with respect to FIG. 6.

The process status portal, which is an interactive user environment on the graphical user interface of the user device, may also be updated. The process status portal provides a user associated with the entity with graphical and/or textual information regarding the backend processes. In some embodiments, the report may be contained within the process status portal. In some embodiments, the process status portal may comprise additional information, displays, readouts, or the like such as icons to summarize the match failures (e.g., a "conflicting count" or "conflict"), a backend process missing from the monitoring data (e.g., a "missing count") or a backend process missing from the baseline (e.g., a "missing baseline count").

The report and/or the process status portal may contain a column, row, or other group where a status is indicated for the one or more backend processes. In this status indicator group, the report and/or the process status portal indicate at least which of the each of the plurality of backend processes from the monitoring data fails to match to the corresponding baseline data, such as through "x" marks, conditional formatting, text, colorization, or the like. Additionally, or alternatively, the report and/or the process status portal may indicate at least which of the each of the plurality of backend processes from the monitoring data matches the corresponding baseline data, such as through check marks, text, conditional formatting, colorization, or the like.

FIG. 3 illustrates a process flow 300 for centralized analysis and monitoring of process data via baseline data mapping, in accordance with an embodiment of the invention. It shall be understood that although the process flow outlined in process flow 300 appears separate from that of process flow 200 in FIG. 2, in some embodiments both processes may be conducted sequentially such that they may form a unitary, uninterrupted process. In other embodiments, process flows 200 and 300 may be conducted simultaneously (e.g., in parallel). In yet additional embodiments, process flows 200 and 300 may be performed at different times altogether.

The process flow 300 may begin at block 302, wherein the system 130 generates a notification. It shall be appreciated that as a result of any mismatch (e.g., "fail") between the status of the backend process of the monitoring data and the status of the same backend process in the baseline data may indicate a malfunction or error with one or more of the entity systems, and as such it may be beneficial for the entity to notify one or more users associated with the entity, such that the user(s) associated with the entity may become aware of and remedy the malfunction or error. To alert the user(s) associated with the entity as to the specific backend process (es) whose status(es) don't match the baseline data, the notification may include an identifier of which of each of the plurality of enabled backend processes fail to match to the corresponding baseline data, such as a text string of the description of each backend process, the node identifier of each backend process, the location of each backend process, or the like. Similarly, in some embodiments, the notification may comprise details of backend processes missing from the baseline data or backend processes missing from the monitoring data (e.g., such that an application may need to be offloaded from the baseline data or onloaded to the baseline data)

The process may then continue at block 304 where the system 130 transmits the notification to at least one user device. It shall be appreciated that within an entity, there may be numerous users associated with the entity who should receive the notification to best investigate the mismatch between the baseline data and the monitoring data. Further, each user associated with the entity may be assigned one or more user devices, such as a computer, mobile device, tablet, and so forth. To this end, each of the backend processes in the baseline data and/or the monitoring data may contain a notification distribution list, wherein the notification distribution list is predetermined, such that each notification distribution list is populated for each of the backend processes by a user associated with the entity. The notification distribution list may include contact information and/or endpoint device 140 information for each of the users associated with the entity who shall receive the notification (s) associated with the given backend process, such as email address(es), phone number(s) for phone notifications or SMS text notification, endpoint device 140 information such as IP address(es), MAC address(es) for the sending of push notifications to the endpoint device(s) 140, and so forth.

At the point at which a user associated with the entity is provided with the notification, a decision may be made as to whether the backend processes that fail to match to the corresponding baseline data are failing to match in an acceptable manner such that the baseline data needs to be revised, for example, if a backend process is inactive in the baseline data but shown as active in the monitoring data.

Alternatively, the user associated with the entity may determine various corrective actions need to be implemented such as to make the backend process status(es) of backend process(es) match the baseline data without revising or altering the baseline data. In the event that corrective actions are implemented, the process may end at this point.

However, the process may continue wherein the system 130 and/or a user associated with the entity may seek to amend the baseline data if any of the each of the plurality of backend processes and their associated status(es) fail(s) to match to the corresponding baseline data. Such amendment of the baseline data will be described with respect to at least blocks 308 through 314. Additionally, or alternatively, the user associated with the entity may seek to add an entirely new backend process to the baseline data, such as to address the missing count or missing baseline count (e.g., for backend processes which are identified in the monitoring data but which have no corresponding backend processes in the baseline data).

Amending the baseline data or adding new baseline data for each backend process which fails to match the corresponding baseline data may comprise a serious of steps executed on a graphical user interface of an endpoint device 140. At block 306, a user associated with the entity may identify the application corresponding to the backend process(es) which failed to match to the corresponding baseline data, or which the user wishes to newly add to the baseline data. For amending the baseline data, identifying the application corresponding to the backend process(es) which failed to match, the system 130 may hide any backend processes which are not associated with the application, such as to not present a user with unnecessary information and instead present the user with a filtered process status portal. Thereafter, at block 308 the system 130 may receive an identification of a backend process type, such as to properly categorize a new backend process to be added to the baseline data or to confirm the backend process type of an existing backend process of the baseline data. Additionally, or alternatively, the system 130 may receive a status selection, such as active (running) or inactive (stopped).

The process may then continue at block 310 where the system 130 receives from a user the identification of a disposition, such as the identification of whether the current selection and/or amendments for the baseline process(es) are to be added as a new backend process in the baseline data or overwrite existing backend process(es) data in the baseline data. As previously described, not only can a user amend the status of a backend process within the baseline data as illustrated in block 312A, but the user may also add a new backend process as illustrated in block 312A. In this way, any subsequent comparisons between the baseline data and the monitoring data will represent the entity's desired active backend processes.

The process may then continue at block 314 where the system 130 stores the new baseline data as specified by the user. The system 130 adds new baseline data to the baseline data, which amends at least a portion of the baseline data corresponding to the backend process failing to match to the corresponding baseline data according to the disposition. The new baseline data is then stored in the database of the storage device 106, in some embodiments overwriting the existing baseline data in the database entirely. In other embodiments, the new baseline data may be stored alongside the previous baseline data in the database.

When a user associated with the entity amends baseline data or adds new backend process(es) to the baseline data, or similarly if the a user associated with the entity removes backend process(es) from the baseline data, it may be beneficial for the system 130 to note the identity of the user (either by username and/or IP address), the time of the change (e.g., amendment, removal, or addition), and a summary of the change. By doing so, a complete record of changes to the baseline data may be kept, ensuring traceability of changes throughout the lifespan of the baseline data. Accordingly, a portion of the system 130 may be dedicated to recording the details of the user, including the identity of the user (either by username and/or IP address), the time of the change (e.g., amendment, removal, or addition), and a summary of the change when stored at block 314. These details of the user may be stored in a database of the storage medium of the storage device 106 and subsequently appended to the report and/or process status portal such that other users are able to access a detailed "change log" of the baseline data. In some embodiments, through the process status portal and/or report, if a user selects a specific backend process, the system 130 will display a record of changes associated with the selected backend process, such as the date at which the backend process was added to the baseline data, the name or username of the user who added it to the baseline data. Similar data may also be presented showing any subsequent changes to the status of the backend process, and the user identification and timestamps related to such changes.

FIG. 4 illustrates a schematic and flow diagram 400 of a system 130 for centralized analysis and monitoring of process data via baseline data mapping, in accordance with an embodiment of the invention. Monitoring tool 402 integrates with BPM utility APIs 412, which monitor and communicate with a backend process monitoring module 404, configured to retrieve the backend processes of at least agents 404a, job schedulers, 404b, and queue processors 404c. Further, BPM utility APIs 412 within the monitoring tool 402 are structured to monitor broken queues in the broken queue monitoring module 406, receive instructions from a user and onboard new backend processes of applications in the application onboarding module 408, and add or update baseline data in the baseline details module 410.

As illustrated, monitoring tool 402 may be operatively coupled to databases 414 (Data Tables) and the entity applications 416. Further, monitoring tool 402 is configured to receive input from administrators 422 (e.g., users associated with the entity), while also preparing and transmitting notifications 418 to the support team 420 and administrators 422, both of whom are users associated with the entities but who carry differentiated roles within the entity, support teams 420 providing specialized services such as problem solving, software development, or the like.

FIG. 5 illustrates a process flow 500 for centralized analysis and monitoring of process data via baseline data mapping, in accordance with an embodiment of the invention. The process flow 500 exemplifies one embodiment of a decision tree, such that the process may be routed accordingly. The process starts at block 502, thereafter the system 130 compares the baseline data status to the monitoring data status as illustrated in block 504. The system 130 does so by fetching the baseline data 509 and the monitoring data status 506 via an API call. The system 130 then matches and compares the two, as previously described in detail. At block 510 the system 130 determines if there is a conflict. If there is not a conflict, a report may be generated and sent to the distribution list of the backend process(es) in block 514. If there is a conflict (e.g., no match between the monitoring data and the baseline data), then a notification may be generated and sent to the distribution list in block 512.

FIG. 6 illustrates an exemplary diagram of a process status portal 600, in accordance with an embodiment of the invention. While the process status portal 600 may be configured to display on the graphical user interface other data as it pertains to the system 130, the process status portal 600 as illustrated in FIG. 6 is intended to represent the output of the comparison between the baseline data and the monitoring data, and the corresponding matched, missing, and/or conflicting backend processes. Process status portal 600 and each of the elements as they pertain to FIG. 6 are illustrated on a graphical user interface of a user device.

Report 604 may be displayed in the process status portal 600. Each row of the report 604 corresponds with a backend process of one or more entity applications. In name column 604a, the name of the backend process is displayed, as may be input by a user during the onboarding process of adding the backend process to the baseline data in some embodiments, or in other embodiments automatically generated due to the association with the backend process (e.g., the metadata associated with the backend process(es) may contain names provided by the creators of the entity application(s)). Ruleset column 604b identifies rulesets associated with each backend process, while mode column 604c and category column 604d identify the modes and categories of the backend process(es), respectively, such as "advanced" or "standard" options for mode, or "kernel", "maintenance", "DSM", "PMF Integration", or the like available for selection as categories associated with each backend process.

Node Identifier ("Node ID") column 604e may provide text strings of the network address of the node associated with the backend process.

Status column 606f provides the current status of each backend process as defined within the monitoring data at the instant at which the backend process was assessed in accordance with the remainder of the present disclosure. Accordingly, status column 606f may indicate "running" for active backend processes, or "stopped" for inactive backend processes, or any number of similar text strings to associate the process data with the status determined in the monitoring data. Baseline compare column 606g illustrates via text, symbol, graphically, or by color the comparison between the monitoring data for the backend process and the baseline data for the corresponding backend process. For example, a check mark may indicate that the baseline data and monitoring data have the same status for a given backend process, while an "x" mark may indicate a failure to match between the baseline data and monitoring data.

Missing count indicator 602a, conflicting count indicator 602b, and/or missing baseline count indicator 602c may provide an overview of a total number (e.g., a quantity) of backend processes from the monitoring data that are not identified in the baseline data, have conflicts in the baseline data (such as conflicts pertaining to statuses), or backend processes from the baseline data that are not identified in the monitoring data. Accordingly, a user associated with the entity is able to quickly view a summary of the issues to be resolved.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for centralized analysis and monitoring of process data via baseline data mapping, the system comprising:

at least one non-transitory storage device; and at least one processing device coupled to the at least one non-transitory storage device, wherein the at least one processing device is configured to:

retrieve a plurality of backend processes;

in response to receiving an input from a user, store baseline data, wherein the baseline data comprises data from a database indicating a status of each of a plurality of enabled backend processes;

monitor the plurality of backend processes at a predetermined interval;

in response to monitoring, store, in a database, monitoring data, wherein the monitoring data comprises data indicating a status for each of the plurality of backend processes;

access the database, at the predetermined interval, to automatically retrieve and iteratively compare the status for each of the plurality of backend processes, including matching each backend process based on a node identifier, and determining deviations in status values between the monitoring data and the corresponding baseline data;

generate, for the predetermined interval, at least one of a report and an update to a process status portal, wherein the report and the process status portal indicate at least which of each of the plurality of backend processes fail to match to the corresponding baseline data; and amend the baseline data if any of the each of the plurality of backend processes fails to match to the corresponding baseline data, wherein amending the baseline data for each backend process comprises:

identifying an application corresponding to the backend process failing to match to the corresponding baseline data;

identifying a backend process type;

identifying a disposition, wherein the disposition indicates either (i) changing the status, or (ii) an addition of a new backend process; and storing new baseline data, wherein the new baseline data amends at least a portion of the baseline data corresponding to the backend process failing to match to the corresponding baseline data according to the disposition.

2. The system of claim 1, wherein the plurality of backend processes comprises at least one selected from the group consisting of a queue processor and a job scheduler, wherein the job scheduler executes logic based on a schedule at a predetermined time interval, and wherein a queue processor is configured to process a flow of objects without regards to time intervals.

3. The system of claim 1, wherein retrieving the plurality of backend processes comprises retrieving a plurality of inbound data import processes, each of the inbound data import processes are configured to monitor a file directory.

4. The system of claim 1, wherein the at least one processing device is further configured to:

generate a notification, wherein the notification comprises an identifier of which of each of the plurality of enabled backend processes fail to match to the corresponding baseline data.

5. The system of claim 4, wherein the at least one processing device is further configured to:

transmit the notification to at least one user device, wherein the at least one user device is associated with a notification distribution list, wherein the notification distribution list is stored in the baseline data, and wherein each backend process of the baseline data comprises a notification distribution list.

6. The system of claim 1, wherein the report comprises details of each change to the baseline data and a user identifier associated with each change to the baseline data.

7. A computer program product for centralized analysis and monitoring of process data via baseline data mapping, the computer program product comprising a non-transitory computer-readable medium comprising code causing a first apparatus to:

retrieve a plurality of backend processes;

in response to receiving an input from a user, store baseline data, wherein the baseline data comprises data from a database indicating a status of each of a plurality of enabled backend processes;

monitor the plurality of backend processes at a predetermined interval;

in response to monitoring, store, in a database, monitoring data, wherein the monitoring data comprises data indicating a status for each of the plurality of backend processes;

access the database, at the predetermined interval, to automatically retrieve and iteratively compare the status for each of the plurality of backend processes, including matching each backend process based on a node identifier, and determining deviations in status values between the monitoring data and the corresponding baseline data;

generate, for the predetermined interval, at least one of a report and an update to a process status portal, wherein the report and the process status portal indicate at least which of each of the plurality of backend processes fail to match to the corresponding baseline data; and amend the baseline data if any of the each of the plurality of backend processes fails to match to the corresponding baseline data, wherein amending the baseline data for each backend process comprises:

identifying an application corresponding to the backend process failing to match to the corresponding baseline data;

identifying a backend process type;

identifying a disposition, wherein the disposition indicates either (i) changing the status, or (ii) an addition of a new backend process; and storing new baseline data, wherein the new baseline data amends at least a portion of the baseline data corresponding to the backend process failing to match to the corresponding baseline data according to the disposition.

8. The computer program product of claim 7, wherein the plurality of backend processes comprises at least one selected from the group consisting of a queue processor and a job scheduler, wherein the job scheduler executes logic based on a schedule at a predetermined time interval, and wherein a queue processor is configured to process a flow of objects without regards to time intervals.

9. The computer program product of claim 7, wherein retrieving the plurality of backend processes comprises retrieving a plurality of inbound data import processes, each of the inbound data import processes are configured to monitor a file directory.

10. The computer program product of claim 7, wherein the code further causes the first apparatus to:

generate a notification, wherein the notification comprises an identifier of which of each of the plurality of enabled backend processes fail to match to the corresponding baseline data.

11. The computer program product of claim 10, wherein the code further causes the first apparatus to:

transmit the notification to at least one user device, wherein the at least one user device is associated with a notification distribution list, wherein the notification distribution list is stored in the baseline data, and wherein each backend process of the baseline data comprises a notification distribution list.

12. The computer program product of claim 7, wherein the report comprises details of each change to the baseline data and a user identifier associated with each change to the baseline data.

13. A computer-implemented method for centralized analysis and monitoring of process data via baseline data mapping, the method is executed by one or more computing processor devices and comprises:

retrieving a plurality of backend processes;

in response to receiving an input from a user, storing baseline data, wherein the baseline data comprises data from a database indicating a status of each of a plurality of enabled backend processes;

monitoring the plurality of backend processes at a predetermined interval;

in response to monitoring, storing, in a database, monitoring data, wherein the monitoring data comprises data indicating a status for each of the plurality of backend processes;

accessing the database, at the predetermined interval, to automatically retrieve and iteratively compare the status for each of the plurality of backend processes, including matching each backend process based on a node identifier, and determining deviations in status values between the monitoring data and the corresponding baseline data;

generating, for the predetermined interval, at least one of a report and an update to a process status portal, wherein the report and the process status portal indicate at least which of each of the plurality of backend processes fail to match to the corresponding baseline data; and amending the baseline data if any of the each of the plurality of backend processes fails to match to the corresponding baseline data, wherein amending the baseline data for each backend process comprises:

identifying an application corresponding to the backend process failing to match to the corresponding baseline data;

identifying a backend process type;

identifying a disposition, wherein the disposition indicates either (i) changing the status, or (ii) an addition of a new backend process; and storing new baseline data, wherein the new baseline data amends at least a portion of the baseline data corresponding to the backend process failing to match to the corresponding baseline data according to the disposition.

14. The computer-implemented method of claim 13, wherein the plurality of backend processes comprises at least one selected from the group consisting of a queue processor and a job scheduler, wherein the job scheduler executes logic based on a schedule at a predetermined time interval, and wherein a queue processor is configured to process a flow of objects without regards to time intervals.

15. The computer-implemented method of claim 13, wherein retrieving the plurality of backend processes comprises retrieving a plurality of inbound data import processes, each of the inbound data import processes are configured to monitor a file directory.

16. The computer-implemented method of claim 13, further comprising:

generating a notification, wherein the notification comprises an identifier of which of each of the plurality of enabled backend processes fail to match to the corresponding baseline data; and transmitting the notification to at least one user device, wherein the at least one user device is associated with a notification distribution list, wherein the notification distribution list is stored in the baseline data, and wherein each backend process of the baseline data comprises a notification distribution list.

17. The computer-implemented method of claim 13, wherein the report comprises details of each change to the baseline data and a user identifier associated with each change to the baseline data.

* * * * *